(12) United States Patent
Ritzka

(10) Patent No.: US 9,005,389 B2
(45) Date of Patent: Apr. 14, 2015

(54) METHOD AND DEVICE FOR THE BUBBLE-FREE BONDING OF LARGE-SURFACE GLASS PANES

(75) Inventor: Wolfgang Ritzka, Thierhaupten (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 299 days.

(21) Appl. No.: 13/392,063

(22) PCT Filed: Oct. 31, 2010

(86) PCT No.: PCT/IB2010/002722
§ 371 (c)(1), (2), (4) Date: May 14, 2012

(87) PCT Pub. No.: WO2011/024083
PCT Pub. Date: Mar. 3, 2011

(65) Prior Publication Data
US 2012/0234456 A1  Sep. 20, 2012

(30) Foreign Application Priority Data
Aug. 25, 2009  (DE) .......................... 10 2009 038 799

(51) Int. Cl.
| | |
|---|---|
| B29C 65/00 | (2006.01) |
| B32B 17/00 | (2006.01) |
| B32B 17/10 | (2006.01) |
| C03C 27/00 | (2006.01) |
| G02C 7/00 | (2006.01) |
| B32B 37/00 | (2006.01) |
| E06B 3/24 | (2006.01) |

(Continued)

(52) U.S. Cl.
CPC ......... *B32B 17/10908* (2013.01); *B05C 5/0216* (2013.01); *B05C 11/1015* (2013.01); *B32B 17/10302* (2013.01); *B32B 17/10972* (2013.01); *B32B 37/003* (2013.01); *B32B 37/1284* (2013.01); *C09J 5/00* (2013.01); *B32B 2315/08* (2013.01); *B32B 2457/12* (2013.01); *F16B 11/006* (2013.01); *C09J 2400/143* (2013.01)

(58) Field of Classification Search
USPC ............ 156/99, 104, 106, 107, 109, 285, 286
See application file for complete search history.

(56) References Cited

U.S. PATENT DOCUMENTS

| | | | |
|---|---|---|---|
| 4,014,733 A * | 3/1977 | Loubet .......................... | 156/446 |
| 4,258,658 A | 3/1981 | Politycki et al. | |

(Continued)

FOREIGN PATENT DOCUMENTS

| | | |
|---|---|---|
| AT | 000 296 U1 | 7/1995 |
| DE | 2 310 502 A1 | 10/1973 |

(Continued)

*Primary Examiner* — Richard Crispino
*Assistant Examiner* — Matthew Hoover
(74) *Attorney, Agent, or Firm* — Slater & Matsil, L.L.P.

(57) ABSTRACT

The invention relates to a method and a device for a bubble-free bonding of large-surface glass panes in an automatic production process. An embodiment of the device comprises: a) a pivoting bench plate having a securing device for receiving a glass pane, b) a barrier material application head having a camera for monitoring, at least one ventilation element being mounted by a mounting head, c) an adhesive metering and application head having a process control sensor for the application of adhesive, d) a gripping device having a covering plate gripper for receiving a covering plate, and e) a vacuum suction device and a closing device for the ventilation system.

17 Claims, 6 Drawing Sheets

(51) Int. Cl.
  *B05C 5/02*  (2006.01)
  *B05C 11/10*  (2006.01)
  *B32B 37/12*  (2006.01)
  *C09J 5/00*  (2006.01)
  *F16B 11/00*  (2006.01)

(56) References Cited

U.S. PATENT DOCUMENTS

| | | | | |
|---|---|---|---|---|
| 4,299,639 | A | * | 11/1981 | Bayer ............................ 156/104 |
| 4,564,410 | A | * | 1/1986 | Clitheros et al. ............... 156/356 |
| 4,703,656 | A | * | 11/1987 | Bhardwaj ........................ 73/644 |
| 4,708,762 | A | | 11/1987 | Lenhardt |
| 5,147,485 | A | * | 9/1992 | Gajewski et al. ............. 156/104 |
| 5,167,756 | A | * | 12/1992 | Lenhardt ........................ 156/578 |
| 6,673,997 | B2 | | 1/2004 | Blieske et al. |
| 6,709,750 | B1 | | 3/2004 | Pohlmann et al. |
| 6,962,638 | B2 | * | 11/2005 | Okino et al. ................... 156/109 |
| 7,135,086 | B2 | * | 11/2006 | Matsuoka ................... 156/272.2 |
| 7,232,497 | B2 | | 6/2007 | Lindberg et al. |
| 7,267,878 | B2 | | 9/2007 | Primke et al. |
| 2002/0043324 | A1 | | 4/2002 | Balduin et al. |
| 2006/0182586 | A1 | * | 8/2006 | Lauvdal ........................ 414/623 |
| 2007/0029026 | A1 | * | 2/2007 | Bolognese ...................... 156/99 |
| 2007/0194438 | A1 | * | 8/2007 | Takasaki et al. .............. 257/704 |
| 2009/0126794 | A1 | | 5/2009 | Dimroth et al. |

FOREIGN PATENT DOCUMENTS

| | | |
|---|---|---|
| DE | 27 28 762 A1 | 1/1979 |
| DE | 35 39 877 A1 | 4/1987 |
| DE | 43 35 673 C1 | 5/1995 |
| DE | 198 24 965 A1 | 12/1999 |
| DE | 198 36 694 A1 | 2/2000 |
| DE | 198 36 695 A1 | 2/2000 |
| DE | 199 03 171 A1 | 8/2000 |
| DE | 199 50 893 C2 | 8/2002 |
| DE | 101 22 437 A1 | 11/2002 |
| DE | 10 2006 007 472 A1 | 8/2007 |
| DE | 20 2007 015 168 U1 | 12/2007 |
| DE | 20 2008 008 794 U1 | 11/2008 |
| DE | 10 2009 038 799 B4 | 7/2011 |
| FR | 1281909 A | 1/1962 |
| JP | 5-238782 A | 9/1993 |
| JP | 5-294682 A | 11/1993 |
| JP | 7-126044 A | 5/1995 |
| WO | WO 03/031173 A1 | 4/2003 |

* cited by examiner

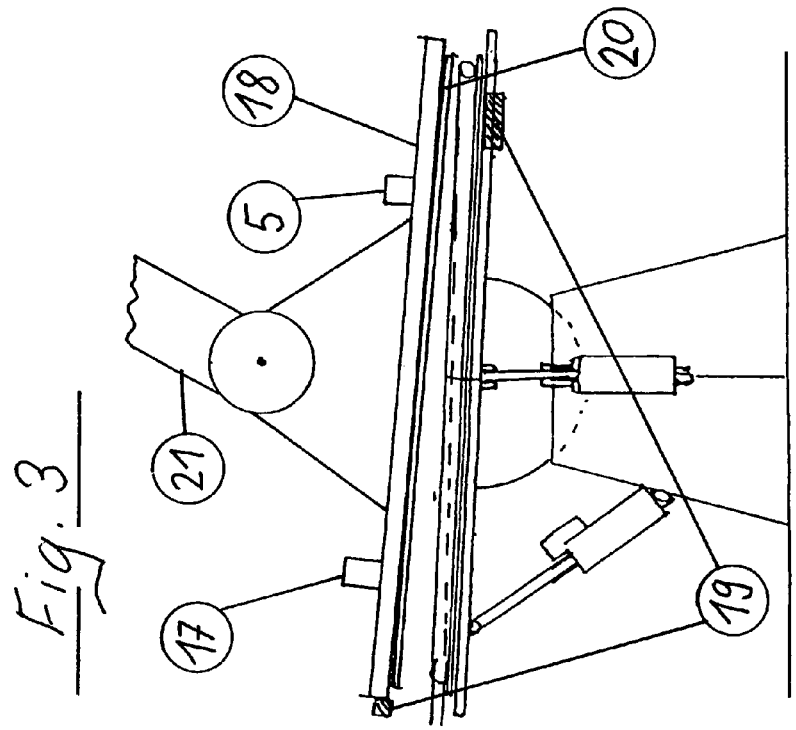
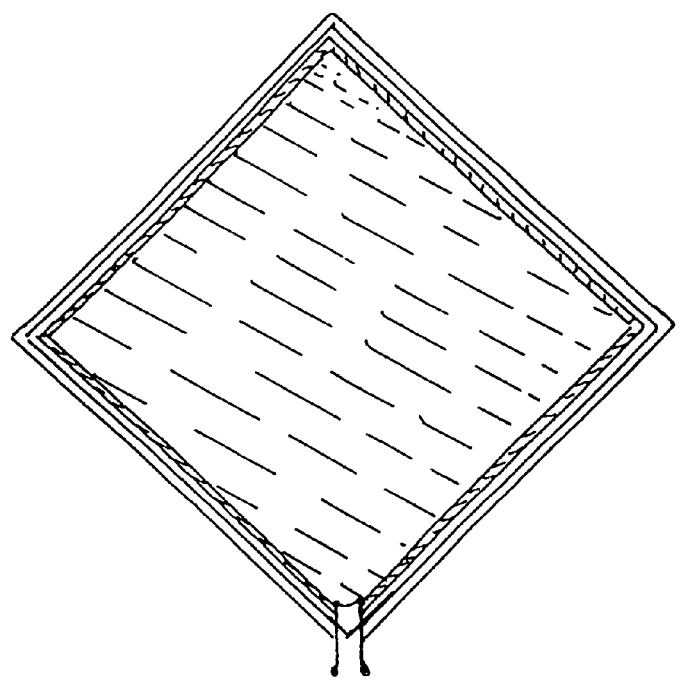
Fig. 3

METHOD AND DEVICE FOR THE BUBBLE-FREE BONDING OF LARGE-SURFACE GLASS PANES

This patent application is a national phase filing under section 371 of PCT/IB2010/002722, filed Aug. 31, 2010, which claims the priority of German patent application 10 2009 038 799.4, filed Aug. 25, 2009, each of which is incorporated herein by reference in its entirety.

TECHNICAL FIELD

The invention relates to a method and a device for the bubble-free bonding of large-surface glass panes.

BACKGROUND

A field of use for such glass panes is the production of solar modules. Solar modules are composed, as a rule, of a photosensitive semiconductor layer provided with a transparent covering for protection against external influences. For this purpose, the individual solar cell units are mostly laminated between a glass pane and a flexurally resistant rear cover pane, for example made from glass, with the aid of an adhesive film or an adhesive. The transparent adhesive must surround solar cell units completely, be UV-stable and be completely bubble-free after the laminating process.

Since the solar cell units are extremely sensitive to breaking, curing casting resins or cross-linkable ethylenevinylacetate (EVA)-based systems are often used as transparent adhesive. In the uncured state, these adhesive systems can be adjusted to have such low viscosity that they surround the solar cell units in a bubble-free manner. After the addition of a hardener or cross-linking agent, a mechanically resistant adhesive layer is obtained. The disadvantage of such solar modules is that they are complicated to produce. Particularly in the case of large-surface facade elements, the embedding of the solar cell units into the liquid casting resin and the controlled curing of the latter constitute a process which is difficult to control. Moreover, some casting resins tend after a few years to form bubbles or to delaminate.

DE 199 50 893 C2 describes a solar module with marginal sealing. The object on which this solar module is based is to specify an even further-improved sealing off of a thin-layer structural element by means of a chalcopyrite absorber layer, as compared with the prior art. Such a chalcopyrite absorber layer serves, in conjunction with a desiccant, to enable moisture to be absorbed and to provide a climate-stable encapsulation of solar modules.

In a solar module with thin-layer solar cells arranged between two panes and sealed by means of a casting compound, with marginal sealing arranged at the outer margin of the panes and composed of a spacer and of at least one adhesive strand applied in portions to the latter on the outside, and with solar cell terminals led outward from the space surrounded by the panes, this object is achieved in the following way. The spacer is composed of an elastomer strand provided with a moisture-absorbing agent, the adhesive strand continuously surrounding the elastomer strand on the outside.

However, this method is suitable only for the production of relatively small solar modules.

DE 101 22 437 A1 discloses a hot-melt adhesive in the form of a granulate, and in view of the prior art given there the set object of the inventors is here to provide single-component moisture-reactive hot-melt adhesive compositions which can be produced and can be applied in free-flowing or pourable form.

This publication describes, further, a method for connecting sheet-like structures or moldings, which is characterized by the following method steps:

a) homogenizing and melting of the reactive granulate powder, if appropriate in an inert atmosphere, with the exclusion of moisture and/or oxygen, using a heatable mixing assembly, if appropriate with high shearing, b) extrusion of the homogenized reactive thermoplastic mixture, if appropriate by means of a shaping nozzle, onto at least one surface of a sheet-like structure or molding;

c) joining of a second sheet-like structure or molding, matching this, to the applied layer of reactive mixture, d) if appropriate, mechanical fixing of the joined sheet-like structures or moldings, e) cooling of the composite system thus formed to room temperature, the reactive hot-melt adhesive composition solidifying and curing along with cross-linking.

The structures or moldings which are under consideration here are wooden or furniture parts, textiles and vehicle parts, but also solar collectors. However, indications as to the special requirements, such as arise in the case of the bubble-free bonding of large-surface glass panes, cannot be found here.

A photovoltaic concentrator module with a multifunction frame is known from DE 10 2006 007 472 A1. The basic object is in this case to provide a photovoltaic concentrator module which can be produced cost-effectively, has a long service life and makes it possible to integrate simply and flexibly additional components which cannot be accommodated or can be accommodated only with difficulty on the lens plate or bottom plate. Furthermore, a method is supposed to be developed which makes it possible to produce such concentrator modules. This method is characterized in that a frame (3), connecting a lens plate (1) and a bottom plate (2), is arranged along the margin of the lens plate (1) and bottom plate (2), and in that, between the frame (3) and the lens plate (1) and/or the frame (3) and the bottom plate (2), on the one hand, at least one first sealing compound (4) and/or adhesive compound (4) and, on the other hand, at least one second sealing compound (5) are introduced along the frame (3) peripherally over at least part of its length, the two sealing and/or adhesive compounds differing from one another in their curing times and/or gas permeabilities. Here, too, two plates are connected to one another, but any indication as to the special problems in the connection of large-surface glass panes cannot be found.

An alternative to curing adhesive systems is the use of films based on polyvinylbutyral (PVB). Here, the solar cell units are embedded between PVB films, and these are connected under increased pressure and increased temperature to the desired covering materials to form a laminate. In this method, the projecting film also has to be removed after pressing and heating. For this purpose, a device for trimming photovoltaic modules is known from DE 20 2008 008 794 U1.

Furthermore, an adhesive for the production of composite glass is known from DE 198 36 695 A1, the use of this adhesive in a method for the production of composite glass free of marginal sealing being described. The object on which this publication is based is to provide, for the production of composite glass, an adhesive which bonds in the finished composite glass between the glass panes, instead of a casting resin, has high viscosity and makes it possible to use a novel automated method for the production of composite glass free of marginal sealing.

The method, described in DE 198 36 695 A1, for using this adhesive in a method for producing composite glass has the following steps:

a) the glass panes are cleaned and dried, b) the adhesive is applied to the inside of the first glass pane lying horizontally, c) the second glass pane is laid congruently onto the adhesive layer, d) the sandwich arrangement obtained is pressed and the adhesive layer is cured by UV radiation.

Examples given for the formats of the composite glasses produced in this way amount to a maximum of 1500×1000 mm. These, however, are not large-surface glass panes within the meaning of the invention. Moreover, the composite glasses described have obviously been manufactured merely in individual pieces.

SUMMARY OF THE INVENTION

In one aspect of the invention the device and the method are based to bond, free of bubbles, large-format coated glass panes with a surface of the order of magnitude of 2000×3000 mm, under clean room conditions, to a covering further glass pane, the glass panes being bonded carefully and reliably, but in the most confined space possible, and high cycle times during the production process being achieved.

BRIEF DESCRIPTION OF THE DRAWINGS

The device according to the invention is described in more detail below. In the drawings.

FIG. 3 shows an illustration of the operation to put in place a cover pane (20);

Figure 1:
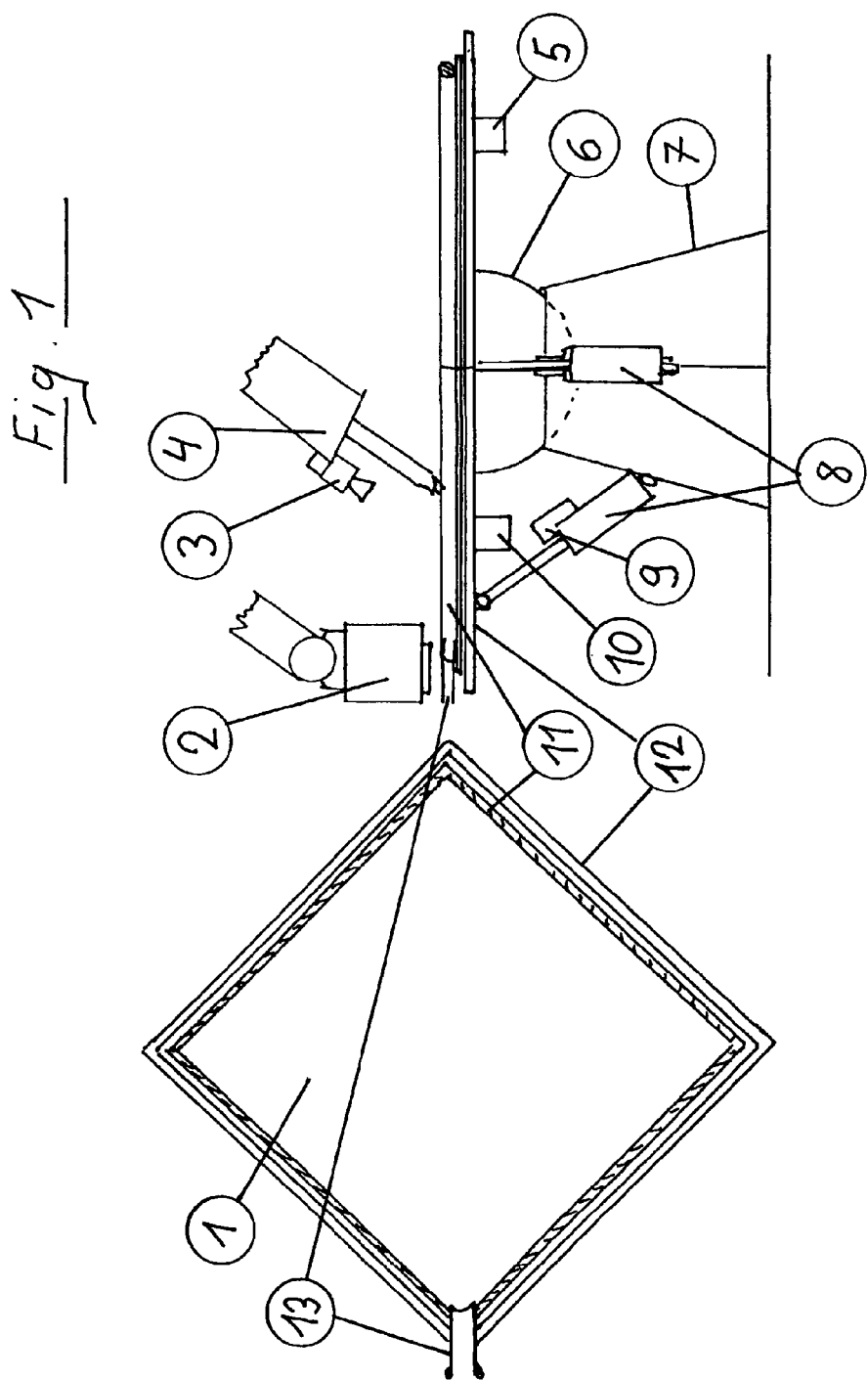
FIG. 1 shows an overview of the entire device according to the invention.

The following list of reference symbols may be used in conjunction with the drawings:

(1) Glass pane (coated)
(2) Mounting head for the deaeration element
(3) Camera for monitoring the butyl application
(4) Butyl application head
(5) Temperature sensor
(6) Main bearing for the pivoting bench
(7) Bench plinth
(8) Pivoting drive with lifting spindle
(9) Inclination sensor
(10) Moisture sensor
(11) Butyl barrier
(12) Pivoting bench plate with fixing device
(13) Deaeration element
(14) Process control sensor for adhesive application
(15) Adhesive metering and application head
(16) Adhesive
(17) Ultrasound generator
(18) Cover pane gripper, pane gripper
(19) Edge detector
(20) Cover pane (glass)
(21) Gripper device
(22) Ultrasound measurement sensor (detection of adhesive layer)
(23) Vacuum suction device
(24) Process monitoring sensor for the deaeration closure
(25) Closing device for deaeration
(26) Transporting and pressing rollers
(27) Pushing device with cleaning unit for the pivoting bench
(28) Quality control sensor

DETAILED DESCRITION OF ILLUSTRATED EMBODIMENTS

FIG. 1 shows an overview of the entire device according to the invention. On the right side of the figure can be seen a bench plinth 7 with a glass pane 1 lying on a pivoting bench plate 12, the glass pane 1 being illustrated in a top view on the left side of the figure. The pivoting bench plate 12 is connected to a bench plinth 7 via a dome-shaped main bearing. Furthermore, the pivoting bench plate 12 is continuously adjustable in inclination via pivoting drives 8, in each case with a lifting spindle, to the right and, in the image plane, forward and rearward. The inclination of the pivoting bench plate 12 is monitored or controlled via the inclination sensors 9. The glass pane 1, as illustrated in the top view, lies along its diagonal on the pivoting bench plate 12 and is firmly connected to the latter via a fixing device, not illustrated separately. The marginal region of the glass pane 1 is closed off on all sides by means of a butyl barrier 11 applied in strip form. This strip of butyl is applied by computer control by means of a butyl application head 4. The thickness and nature of the application and the exact position of the butyl barrier are monitored by a camera 3 or are controlled by feedback.

Since, as can be seen in more detail from the following figures, the glass pane 1 is tilted to the right during or before the application of the adhesive 16, a deaeration element 13 is mounted on the left side which, in the tilted position, is higher than the right side. This deaeration element 13 can be seen in FIG. 1 in the top view both on the left side of the image at the end of the horizontally illustrated diagonal of the glass pane 1 and in cross section on the right side of the image. Above this region, in which the deaeration element 13 is shown in FIG. 1 on the right side of the image, is illustrated the associated mounting head 2 for inserting the deaeration element 13 into the butyl barrier 11 described. This operation of inserting a deaeration element 13 also takes place by computer control at a given time point during the process of joining the glass pane 1 and a cover pane 20 together.

The temperature sensor 5 and moisture sensor 10 shown in FIG. 1 serve for detecting ambient parameters which are necessary for controlling the bonding process.

Figure 2:
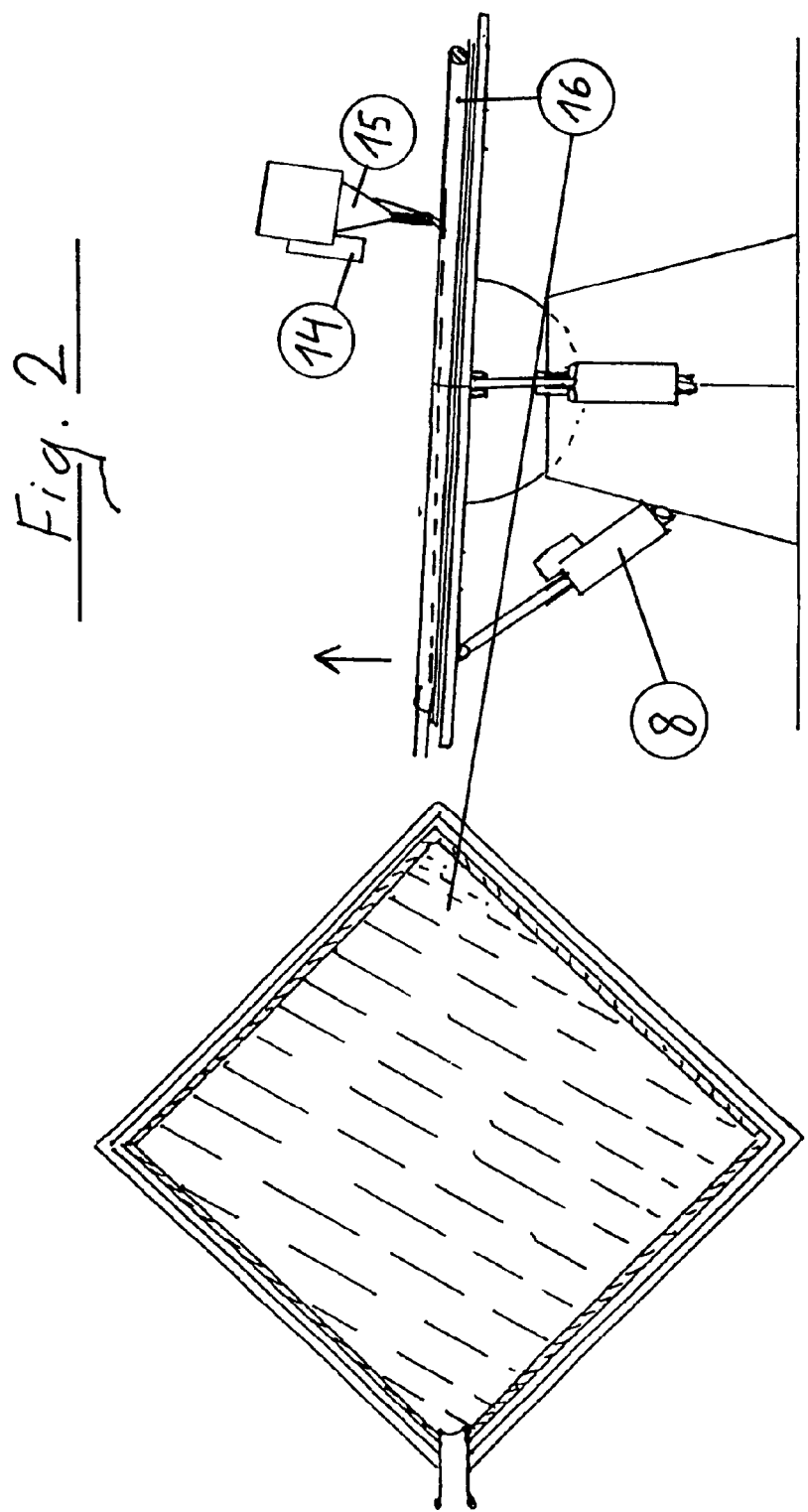
FIG. 2 shows an illustration of adhesive application.

FIG. 2 shows an illustration of adhesive application. Adhesive application takes place after the application of the butyl barrier 11 and the installation of the deaeration element 13. In this case, the adhesive 16 is applied by means of the adhesive metering and introduction head 15, and application is monitored or controlled via the process control sensor 14. When the pivoting bench plate 12 is in the position shown in FIG. 1, it is easily tilted via the left pivoting drive 8 in such a way that the deaeration element 13 assumes a raised position in relation to the position shown for the adhesive metering and introduction head 15. This is indicated in FIG. 2 by the vertical arrow. In this position of the pivoting bench plate 12, the surface of the adhesive 16 is diagrammatically illustrated horizontally, so as to follow gravity, and reaches the deaeration element 13 at the lower margin of its outlet orifice. In the left part of the image, the glass pane 1 is illustrated as being wetted completely by adhesive 16 from above, a large part of the adhesive 16 being located in the lower part of the glass pane 1 on account of the downward gradient across the diagonal of the glass pane 1.

An illustration of the operation to put in place a cover pane (20) can be seen in FIG. 3. In addition to the cross section of FIG. 2, in FIG. 3 there can be seen a cover pane gripper 18 which is formed in terms of its surface by a gripping device 21, such as, for example, a robot arm, and which on its underside has grasped a cover pane 20 from above and put it in place onto the glass pane 1. The cover pane 20, in terms of the position of its diagonal parallel to the drawing plane, is oriented in the same way as the underneath glass pane 1. Thus, under the control of the gripping device 21, both glass panes 1,20 begin to approach one another, the first point of contact of the two glass panes 1, 20 taking place in the region of the lower-lying end of the diagonal. To assist the operation of placing the two glass panes 1,20 exactly one on the other, the illustrated edge detectors 19 are used. During the operation described, the cover pane gripper 18 not only descends slightly, but also at the same time varies its inclination in such a way that the adhesive 16 is conveyed slowly to the higher-lying end of the diagonal of the two glass panes 1,20. During this operation, the butyl barrier 11 ensures the desired delimitation of the adhesive 16 and its uniform distribution in the direction of the deaeration element 13 at the higher-lying end of the diagonal of the two glass panes 1,20. An ultrasound generator 17 ensures the uniform distribution of the adhesive 16 and the breakdown of possible air bubbles. The ultrasound generator 17 stands in this context for a special extended form of the device according to the invention or of the fundamental method in which, in the distribution of adhesive 16, together with the progress of the "adhesive front" by the approaching cover pane 20, punctiform and/or linear application of ultrasound is used.

Figure 4:
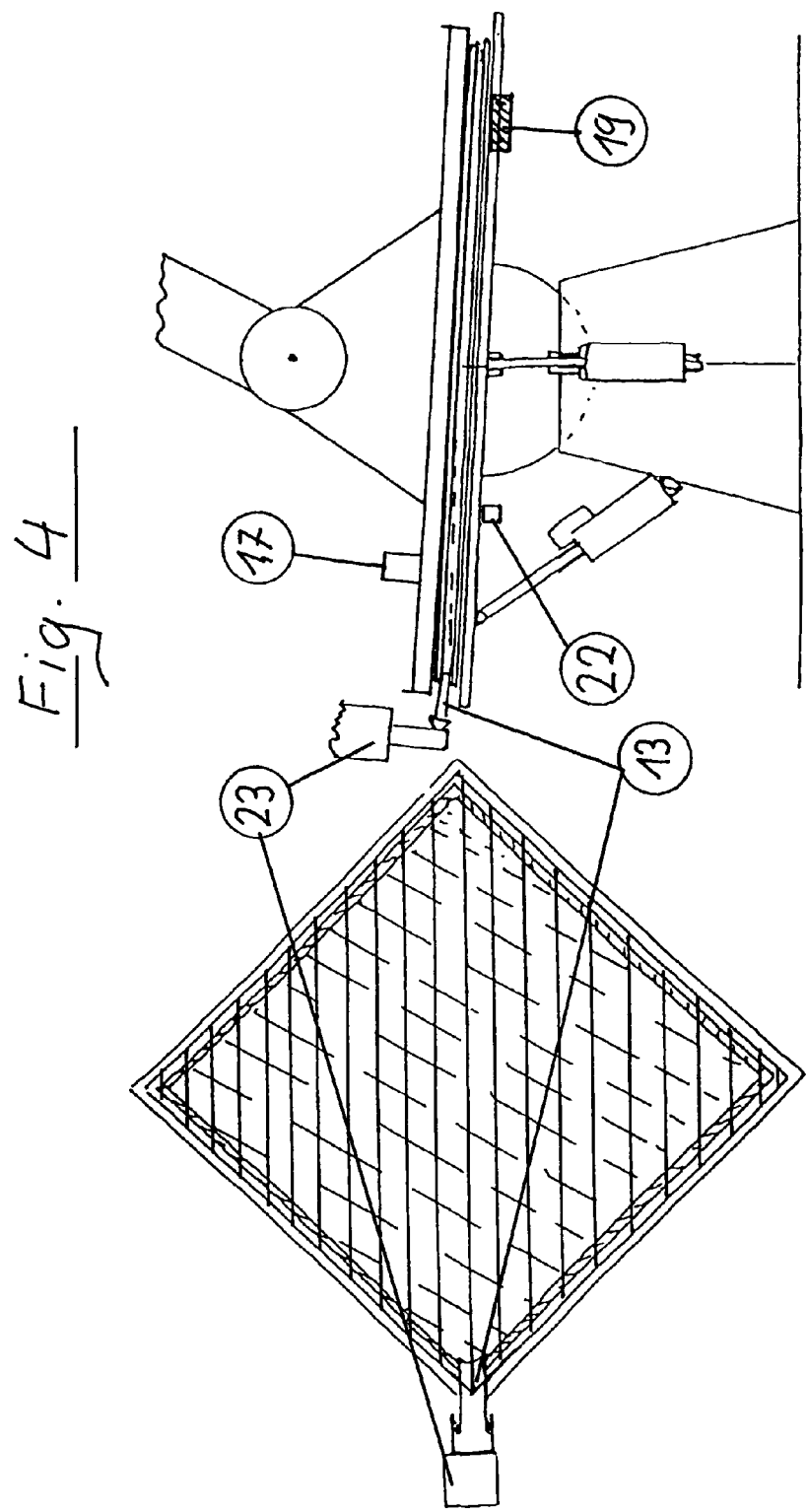
FIG. 4 shows an illustration of the pressing operation.

FIG. 4 shows an illustration of the pressing operation. In addition to the ultrasound generator 17, as is also described in FIG. 3, an ultrasound measurement sensor 22 for measuring the thickness of the adhesive layer is provided here. The is because, as a result of the compression of the butyl barrier 11 because of the approaching movement of the cover pane 20 to the glass pane 1, the desired layer thickness of the adhesive 16 is also set, this being determined by the sensor 22 and being transferred as a process parameter to a central control computer. In the method step illustrated in FIG. 4, excess adhesive 16 can escape through the deaeration element 13, but essentially air bubbles accumulating in this region are sucked away by means of a vacuum suction device 23.

Figure 5:
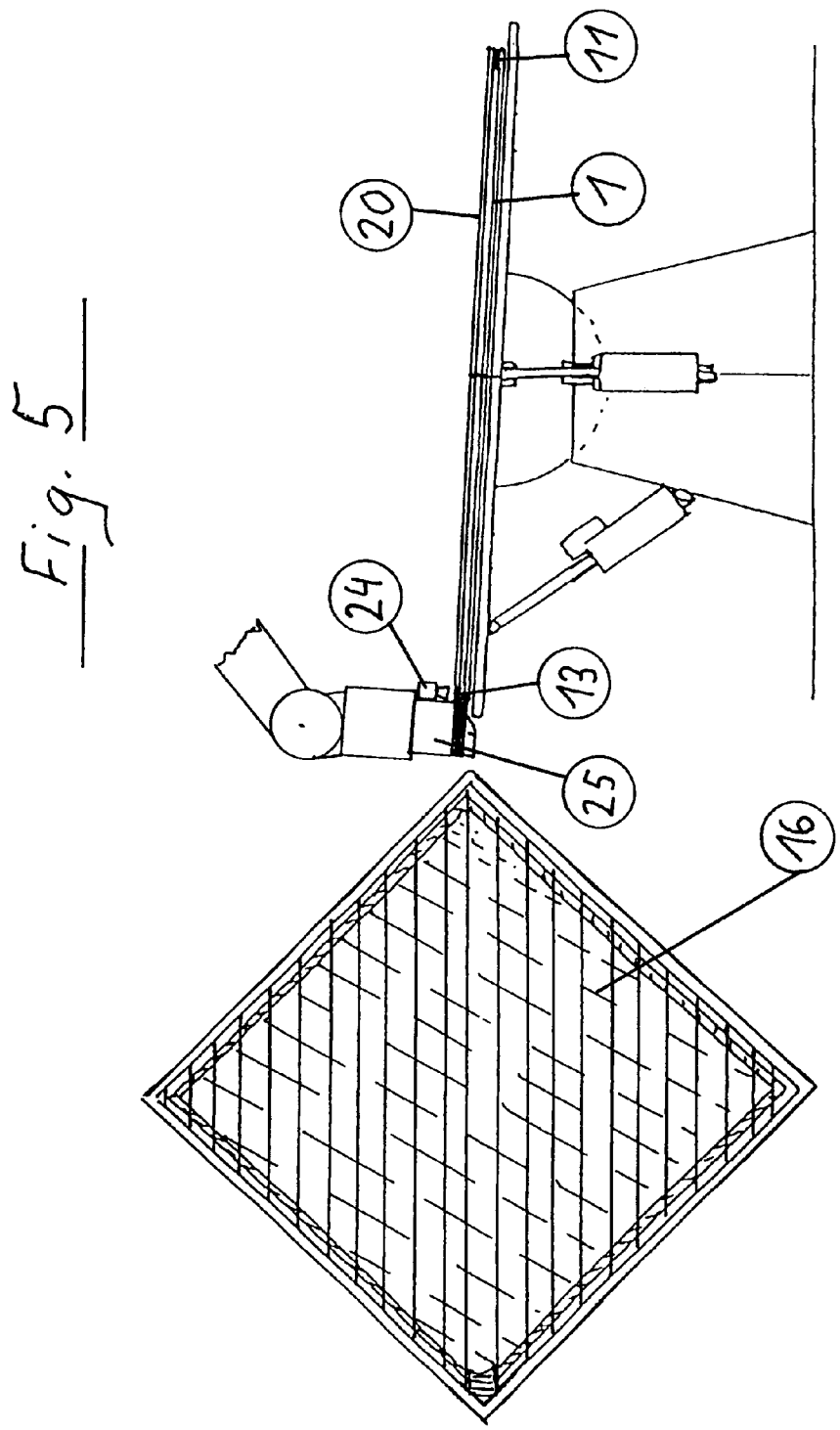
FIG. 5 shows an illustration of the deaeration operation.

FIG. 5 is based on an illustration of the deaeration operation, the adhesive 16 being distributed (crossed hatching). Here, essentially, the closing device 25 for deaeration is illustrated, which is assigned a process monitoring sensor 24. The type of closing device 25 depends in this case on the design of the deaeration element 13. What is decisive is the material of which the deaeration element 13 is composed. Thus, thermoplastic material can be melted and metallic material can be soldered. In special instances, a plurality of deaeration elements 13 may be arranged next to one another and/or above one other. In this case, of course, the surface size of the respective glass panes 1, 20 also plays an important part. The butyl barrier 11 has at this stage reached its final thickness and extent.

Figure 6:
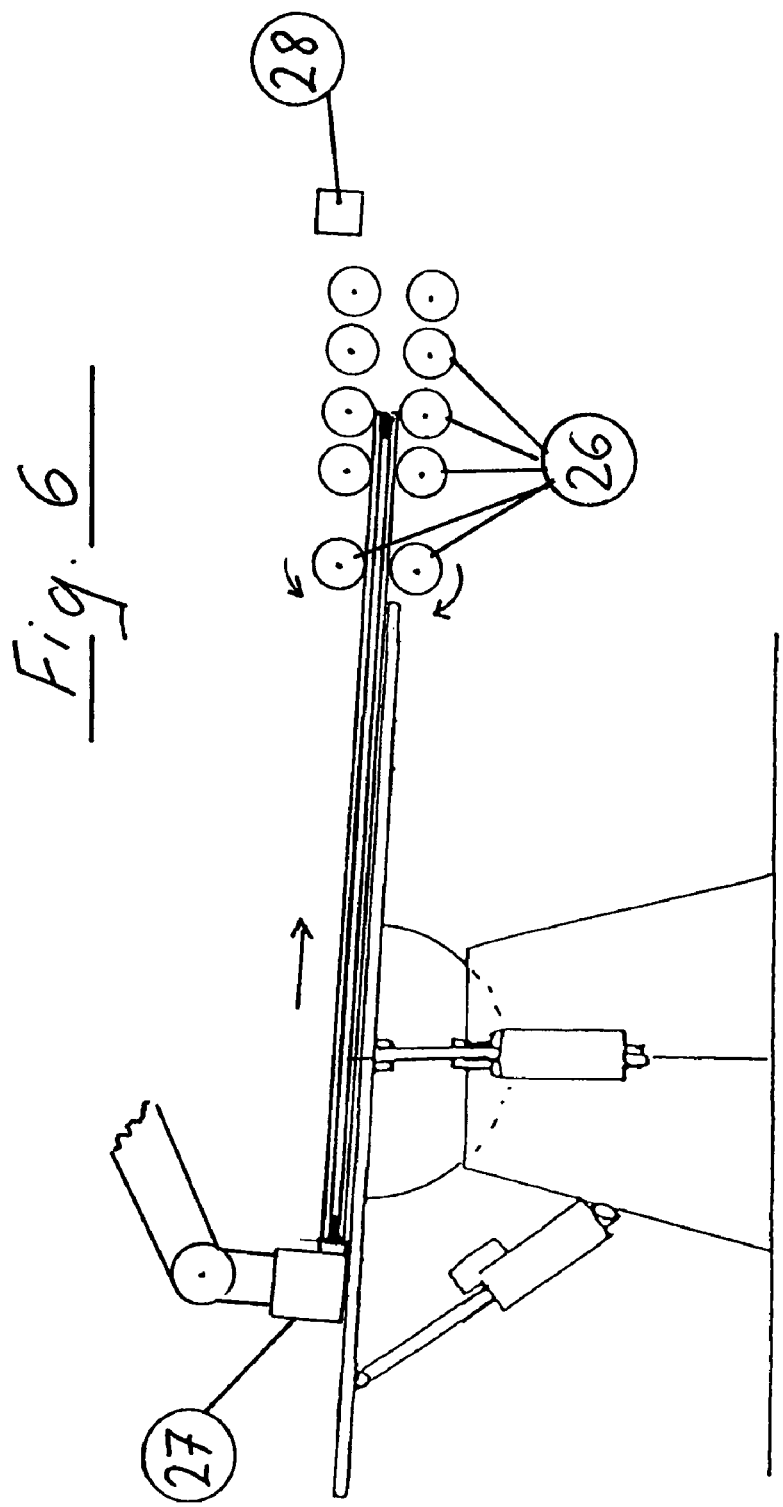
FIG. 6 shows an illustration of the transporting away of the finished product.

FIG. 6 shows an illustration of the transporting away of the finished product. The pushing device 27 pushes the connected glass panes 1,20 from the pivoting bench plate 12 into the region of the transporting and pressing rollers 26. At the same time, the pivoting bench plate 12 is cleaned. The quality control sensor 28 monitors the bonded product in terms of the criteria desired by the respective user.

The complex control of the movement sequences described necessitates a special control program.

The invention claimed is:

1. A device for making bonded glass panes comprising:
   a pivoting bench plate with a fixing device configured to receive a first glass pane;
   a barrier material application head with a camera configured to monitor the application of-the barrier material;
   a mounting head configured to place a deaeration element onto the first glass pane;
   a movable adhesive metering and application head with a process control sensor configured to apply an adhesive layer;
   a gripping device with a cover pane gripper configured to place a cover glass pane onto the first glass pane;
   a vacuum suction device; and
   a closing device.

2. The device as claimed in claim 1, further comprising transporting and pressing rollers configured to press and convey the bonded glass panes.

3. The device as claimed in claim 1, further comprising a magazine comprising pane grippers or cover pane grippers having different sizes.

4. The device as claimed in claim 1, further comprising a temperature sensor configured to ensure clean room conditions.

5. The device as claimed in claim 1, further comprising an ultrasound generator and an ultrasound measurement sensor configured to assist in bonding of the glass panes.

6. The device as claimed in claim 1, wherein the barrier material application head comprises a butyl application head.

7. The device as claimed in claim 1, further comprising a moisture sensor configured to ensure clean room conditions.

8. The device as claimed in claim 1, further comprising a pushing device configured to push the bonded glass panes to a transporting device.

9. The device as claimed in claim 8, wherein the transporting device comprises transporting and pressing rollers.

10. The device as claimed in claim 1, further comprising an edge detector configured to align the first glass pane with the cover glass pane.

11. A device for making bonded glass panes comprising:
    a pivoting platform with a fixing device configured to receive a first glass pane;
    a barrier material application head configured to apply a barrier material;
    a mounting head configured to insert a deaeration element into the barrier material;
    a movable adhesive metering and application head configured to apply an adhesive layer;
    a gripping device with a gripper configured to bond a second glass pane to the first glass pane;
    a vacuum suction device configured to suction bubbles from adhesive layer of the bonded glass panes; and
    a closing device configured to seal the deaeration element.

12. The device according to claim 11, further comprising a camera attached to the barrier material application head.

13. The device according to claim 12, wherein the movable adhesive metering and application head comprises a process control sensor.

14. A device for making bonded glass panes comprising:
    a pivoting platform with a fixing device configured to receive a first glass pane;
    a barrier material application head configured to apply a barrier material;

a mounting head configured to insert a deaeration element into the barrier material;

a movable adhesive metering and application head configured to apply an adhesive layer;

a gripping device with a gripper configured to bond a second glass pane to the first glass pane;

a vacuum suction device configured to suction bubbles from adhesive layer of the bonded glass panes;

a closing device configured to seal the deaeration element; and an ultrasound generator configured to break down the bubbles.

15. The device according to claim 14, further comprising an ultrasound measurement sensor configured to measure a thickness of the adhesive layer.

16. The device according to claim 14, further comprising a camera attached to the barrier material application head.

17. The device according to claim 14, wherein the movable adhesive metering and application head comprises a process control sensor.

* * * * *

UNITED STATES PATENT AND TRADEMARK OFFICE
CERTIFICATE OF CORRECTION

PATENT NO. : 9,005,389 B2
APPLICATION NO. : 13/392063
DATED : April 14, 2015
INVENTOR(S) : Wolfgang Ritzka It is certified that error appears in the above-identified patent and that said Letters Patent is hereby corrected as shown below:

On the Title Page, Item (22) PCT Filed:, delete "Oct. 31, 2010" and insert --Aug. 31, 2010--.

Signed and Sealed this
Thirteenth Day of October, 2015

Michelle K. Lee
*Director of the United States Patent and Trademark Office*